Patented Dec. 29, 1942

2,306,688

UNITED STATES PATENT OFFICE 2,306,688

HYDROGENOLYSIS OF CRUDE CARBOHYDRATES

Julian K. Dale, Terre Haute, Ind., assignor to Commercial Solvents Corporation, Terre Haute, Ind., a corporation of Maryland No Drawing. Application June 28, 1939, Serial No. 281,658

3 Claims. (Cl. 260—635)

My invention relates to a process for producing polyhydric alcohols and other valuable products from polyhydric alcohols of higher molecular weight, or from carbohydrates, by catalytic hydrogenation. More specifically, my invention relates to an improved process for utilizing crude raw materials for such a reaction.

It has been known that sugars may be transformed to polyhydric alcohols and compounds of lower oxygen content, and that polyhydric alcohols may be transformed to polyhydric alcohols of lower molecular weight, by a catalytic hydrogenation process termed "hydrogenolysis". In such a process, for example, sugars such as dextrose or sucrose may be transformed to mannitol, sorbitol, glycerol, propylene glycol, and other products, in varying proportions. A number of catalysts have been proposed for this process, one of the most desirable types being that prepared from an insoluble copper compound and a metallic fluoride, as described in co-pending application, Serial No. 281,602 filed June 28, 1939, by Leonard A. Stengel and Frank E. Maple, the preferred form of this catalyst being a coprecipitated cupric oxide-calcium fluoride catalyst.

Most of the catalysts available for this type of reaction will ordinarily give optimum yields of hydrogenolytic products only when relatively pure raw materials are employed in the reaction, and give very much reduced yields if crude materials, such as mollasses, are employed. I have found that this is particularly true in the case of the copper-metallic fluoride catalysts referred to above. For example, when employing molasses as the raw material for the reaction, relatively satisfactory yields may be obtained at very low concentrations of molasses in the hydrogenolysis reaction medium, but at concentrations sufficiently high to be economically desirable the yield may be seriously reduced, in many instances only carbon and tarry-like products being obtained.

I have now discovered that a primary cause of this reduced yield constitutes the presence of chlorides in the molasses or other crude raw material, and that full yields may be obtained if the reaction is effected substantially in the absence of the chlorine ion. In accordance with my present invention, therefore, the copper-metallic fluoride catalysts preferably should be washed free from chlorides, a chloride-free reaction medium should be employed, and the polyhydroxy compounds to be subjected to the hydrogenation reaction should be free from chloride contamination.

When employing relatively pure materials, such as crystalline sugars for the hydrogenolysis reaction, no treatment for the removal of chlorides is ordinarily necessary. However, some materials of this type, such as invert sugars or corn sugars resulting from hydrochloric acid hydrolyses, may contain sufficient chlorides to inhibit the reaction. Such materials may readily be freed from chlorides by dissolving them in a suitable medium and adding a silver compound of greater solubility than silver chloride, to precipitate the chlorides as silver chloride.

In the case of crude carbohydrate syrups, such as blackstrap molasses, high-test mollasses, and the like, the simple treatment above described is ineffective. On addition of a suitable silver compound to such materials, silver chloride is precipitated, but the finely-divided precipitate remains in suspension and it is practically impossible to remove it by filtering, centrifuging, or the like. One aspect of my present invention, therefore, comprises a method for the treatment of crude carbohydrate syrups for the removal of chlorides to form a suitable product for use in the hydrogenolysis reaction.

I have found that the crude carbohydrate syrups can be satisfactorily freed from chlorides by the silver chloride precipitate method, if such syrups are first treated with methyl or ethyl alcohol to precipitate other impurities of the crude syrups. By this preliminary treatment, a sludge is formed which settles readily, allowing most of the liquid to be removed by dectantation and necessitating filtering or centrifuging only the settled sludge. It is believed that the material removed by this treatment comprises largely inorganic salts of organic acids, but it is to be understood that my invention is not to be limited in any way to any such theory. Whatever may be the nature of the material removed, the solution after this treatment is satisfactory for the silver chloride precipitation method of removing chlorides.

The solvent utilized for the preliminary treatment should contain sufficient water to maintain only a single liquid phase in the resulting mixture. In the case of methyl alcohol, very little and perhaps no water is required for this purpose, whereas, in the case of ethyl alcohol a considerable proportion of water may be required to secure complete miscibility. When employing methyl alcohol as a solvent for the preliminary treatment, I prefer to utilize as nearly anhydrous conditions as are practical for the material in question. Thus, molasses may be concentrated to a moisture content of approximately 5 per cent, and then mixed with anhydrous methyl alcohol. In the case of ethyl alcohol, some water, in addition to the water present in the common carbohydrate syrups, will usually be required. Thus, in the case of high-test molasses aqueous alcohol of 70% to 80% strength will usually be required to secure complete miscibility.

The amount of solvent to be employed for the preliminary treatment may vary within relatively wide limits. In general, I have found that from 2 to 6 times the weight of the crude material (dry basis) will constitute a satisfactory quantity of solvent. The solvent for this purpose may conveniently constitute the reaction medium for the hydrogenolysis reaction, and for such purpose the ratio of solvent to crude material may suitably constitute the preferred ratio for the reaction. Thus, for the hydrogenolysis of high-test molasses, a quantity of solvent amounting to approximately three times the weight of the molasses (dry basis), it will constitute a suitable ratio both for the preliminary sludge removed, and for the hydrogenolysis reaction.

It should be noted that the solvents employed in the preliminary treatment in my purification process do not constitute true solvents for crystalline sugars, such as are present in the crude materials being treated. These aqueous alcohol mixtures serve as solvents only when the sugars are in an amorphous state, rather than a crystalline state. My process is therefore adapted to the purification of only those crude carbohydrate products which contain the carbohydrate in an amorphous state, such as the common crude sugar syrups previously referred to. It will be apparent, however, that crude crystalline products may easily be transformed into a syrup suitable for use in my process.

In carrying out my process, the crude syrup is mixed with the appropriate amount of solvent, and for ease of securing miscibility I prefer to heat the mixture and agitate continuously until a single liquid phase is secured. The mixture may suitably be refluxed for this purpose, or may be maintained at a temperature below the reflux temperature, if desired. After miscibility is secured, the mixture may be cooled and allowed to stand to permit the resulting flocculent precipitate to settle. This usually requires a considerable period of time, and I prefer to allow the mixture to stand for a period of 24 hours, or more. At the end of this time, the clear supernatant liquor may be decanted, and the remaining sludge filtered or centrifuged. The liquid obtained from the filtering or centrifuging operation is added to that obtained by decantation, and the resulting solution is then analyzed for chloride content. The equivalent amount of a suitable silver compound, such as silver nitrate, is then added, with thorough agitation, to precipitate the chlorides as silver chloride. The resulting mixture is then allowed to stand to permit the silver chloride precipitate to settle, and the supernatant liquid is then decanted, as in the preliminary treatment. The sludge may be filtered or centrifuged and the liquid recovered thereby added to the liquid obtained by decantation. The resulting solution, after suitable adjustment of carbohydrate concentration, is then ready for use in the hydrogenolysis reaction.

It will be evident, of course, that any silver compound which is more soluble than silver chloride, in the solvent employed, will be suitable for the removal of the chlorides. Ease of precipitation of the chlorides is secured by the use of a readily-soluble silver compound, such as silver nitrate; whereas danger from excess dissolved silver is avoided by the use of a relatively insoluble compound such as silver carbonate. Compounds of intermediate solubility possess neither of these advantages, and they are therefore less desirable. For economy of operation, the presence of dissolved silver should be avoided, either by adding only the theoretical amount based on an accurate analysis, or by employing a very insoluble silver compound, such as silver carbonate. If dissolved silver is thus avoided, all of the silver utilized in the process may be recovered in the final filtering or centrifuging operation, and may be reconverted to the form used in the precipitating step, or to other marketable silver compounds, by methods well known in the art.

My purification process is particularly adapted to the treatment of high-test molasses, since this material normally contains less chlorides than other readily available crude carbohydrate materials. My invention will be further illustrated by specific examples of the treatment of high-test molasses.

*Example I*

High-test molasses (81.5° Brix) was mixed with various solvents, as indicated in the table below, the amount of solvent in each case being approximately three times the weight of the molasses (dry basis). The mixtures were refluxed to secure miscibility, and were then allowed to stand for 24 hours to allow the precipitate to settle. The supernatant liquid was decanted in each case, the resulting sludges filtered, and the filtrate added to the decanted liquid. The liquids were analyzed for chloride content, and the theoretical amounts of silver nitrate were added in each case with thorough agitation. The mixtures were then allowed to settle for 24 hours, after which the supernatant liquid was decanted and the sludge filtered, as in the preliminary treatment. The amount of the precipitates obtained in the preliminary treatment, are shown in the table below:

| Solvent | Initial precipitate, per cent by weight of original molasses (dry basis) | Silver chloride precipitate, per cent of theoretical based on chlorine analysis of molasses |
| --- | --- | --- |
| | | *Per cent* |
| Anhydrous methyl alcohol | 3.1 | 100 |
| 80% ethyl alcohol | 2.4 | 100 |
| 70% ethyl alcohol | 1.5 | 100 |

In each of the above cases the final clear liquid obtained was completely free from chlorides, as indicated by the addition of further silver nitrate. As may be seen from the table, decreasing amounts of impurities are removed in the initial stage of the process, with increasing water content of the solvent employed. This resulted in increasing difficulty in the separation of the silver chloride precipitate in the final stage of the process. In the case of methyl alcohol, the silver chloride precipitate appeared granular and settled very readily, whereas with the 70% ethyl alcohol the precipitate was somewhat flocculent in appearance, and settled with greater difficulty.

Example II

High-test molasses (81.5° Brix) was concentrated by evaporation to approximately 95° Brix, and was then treated as in Example I, employing anhydrous methanol as the solvent. The final clear liquid obtained was utilized for hydrogenolysis under the following conditions: The solution, together with approximately 12.5 per cent by weight of a cupric oxide-calcium fluoride catalyst (based on the weight of the molasses, dry basis) was introduced into a reaction vessel of the Adkins rocking bomb type. The air in the vessel was displaced by hydrogen, and hydrogen was introduced to a pressure of approximately 2000 pounds per sq. in. The temperature was then raised, while agitating the bomb, to a temperature of 245° C., and was maintained at this point for 5 hours, with continued agitation. During this time, hydrogen was introduced intermittently to replace that absorbed in the reaction, maintaining the pressure in the vessel at approximately 2000 pounds per sq. in. At the conclusion of the reaction, the bomb was cooled in a current of cold air, the hydrogen pressure released, and the product removed for analysis. A sample of untreated high-test molasses was dissolved in anhydrous methanol at the same concentration employed for the treated sample, and the resulting solution was subjected to hydrogenolysis under identical conditions. The following results were secured:

| Type of molasses | Yield of propylene glycol fraction, per cent by weight of dry molasses | Yield of glycerol fraction, per cent by weight of dry molasses |
| --- | --- | --- |
| Untreated | 15.1 | 18.9 |
| Treated | 50.7 | 27.9 |

It should be understood, of course, that the above examples are merely illustrative and do not limit the scope of my invention. Although my process is particularly adapted to the use of high-test molasses, other crude carbohydrate materials such as crude corn sugar syrups, hydrol, and the like, may be treated, and other equivalent solvents may be employed in the process. The mechanical details of the operation can of course be varied in numerous respects, as will be evident to those skilled in the art, and such modifications and the use of any equivalents which would naturally occur to those skilled in the art, are to be understood as included within the scope of my invention.

My invention now having been described, what I claim is:

1. In a process for converting a crude carbohydrate syrup into a material adapted to catalytic hydrogenolysis, in which the carbohydrate in said syrup is in an amorphous state and in which minor amounts of chlorides are removed from the syrup by adding thereto a soluble silver compound to precipitate the chlorides as silver chloride, the syrup containing impurities that inhibit the separation of the said precipitate from the syrup, the improvement which comprises facilitating the separation of the said precipitate by adding to the syrup, before adding the soluble silver salt, a sufficient quantity of a saturated aliphatic alcohol of less than three carbon atoms to precipitate the said impurities in the syrup.

2. The process of claim 1 in which the syrup is high test molasses, the alcohol is anhydrous methyl alcohol and the silver salt is silver nitrate.

3. The process of claim 1 in which the syrup is high test molasses, the alcohol is aqueous ethyl alcohol of approximately 80% concentration and the silver salt is silver nitrate.

JULIAN K. DALE.